SHIGEO AIKI AND
TATSUMI TORII
INVENTOR

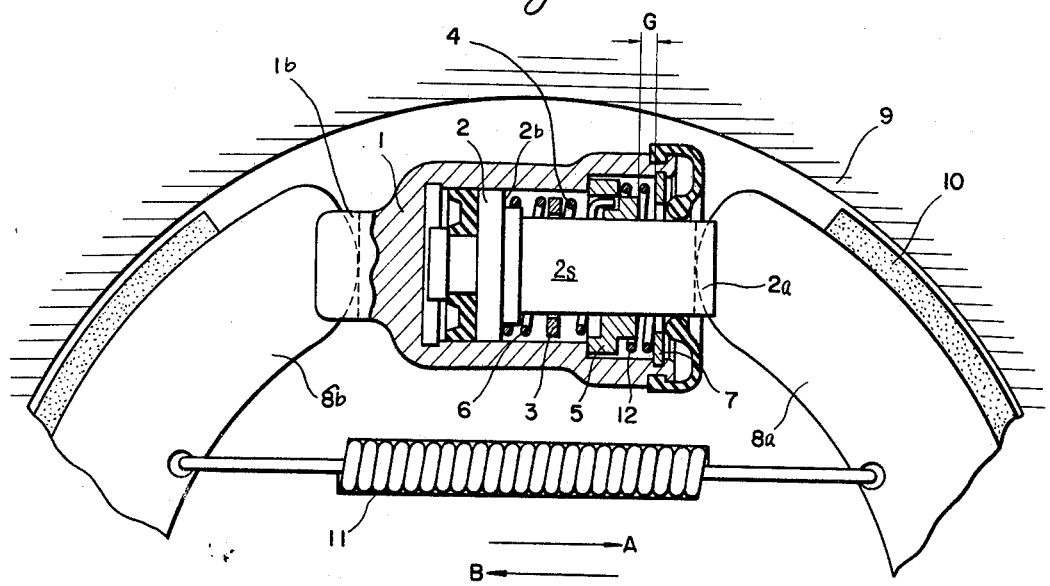
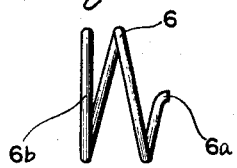
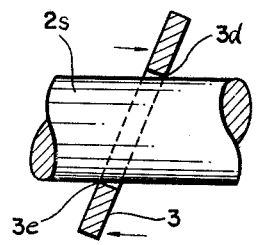
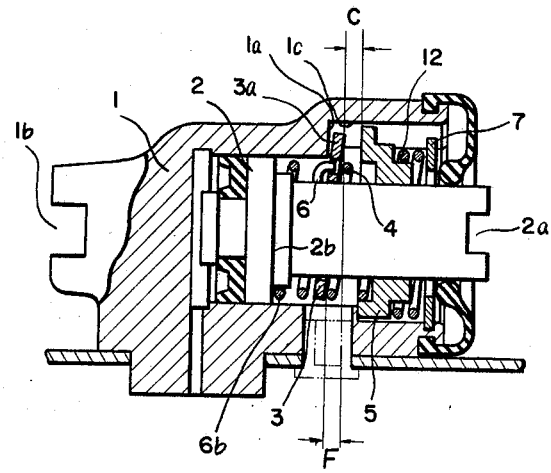
SHIGEO AIKI AND
TATSUMI TORII
INVENTOR

United States Patent Office 3,502,180
Patented Mar. 24, 1970

3,502,180
AUTOMATIC DEVICE FOR ADJUSTING BRAKE CLEARANCE FOR VEHICLES
Shigeo Aiki and Tatsumi Torii, Kariya, Japan, assignors to Aisin Seiki Kabushiki Kaisha, Kariya, Japan
Filed Dec. 21, 1967, Ser. No. 692,511
Claims priority, application Japan, Dec. 28, 1966, 42/1,470; Apr. 19, 1967, 42/33,007
Int. Cl. F16d 51/52, 65/54
U.S. Cl. 188—79.5     3 Claims

ABSTRACT OF THE DISCLOSURE

Automatic device provided in the brake wheel cylinder for adjusting the brake clearance, comprising a piston having a piston stem connected to a brake shoe, an annular control disc loosely mounted onto the piston stem and normally slightly inclined by means of springs to firmly engage with the piston stem, and a stopper provided in the cylinder and adapted for stopping and erecting said inclined control disc to release the firm engagement thereof with the piston stem, thereby allowing further movement of the piston stem alone for any increased amount of the brake clearance, so that the starting point of the piston is gradually advanced according to increase of the brake clearance, whereby the brake clearance is automatically adjusted.

---

The principal object of the present invention is to provide in the wheel cylinder a new device for automatically adjusting the brake clearance, which is simple in construction and reliable in operation.

It is another object of the present invention to provide a device for automatically adjusting the brake clearance, in which the driver can readily be warned of the necessity of renewing the brake lining when it is unduly worn.

With the foregoing objects in view, together with others which will appear as the description proceeds, the invention resides in the novel construction, combination and arrangement of parts, all as will be described more fully hereinafter and illustrated in the accompanying drawings.

In the drawings:

FIGURES 5 and 6 show two different springs biassing said control disc to inclined position;

FIGURE 7 is a section of said control disc as mounted on a piston stem and as held in the inclined position, exaggeratedly showing the relation of said two elements; and FIGURES 8 and 9 show vertical and horizontal sections, respectively, of a modified form of the embodiment of this invention.

Figure 1:
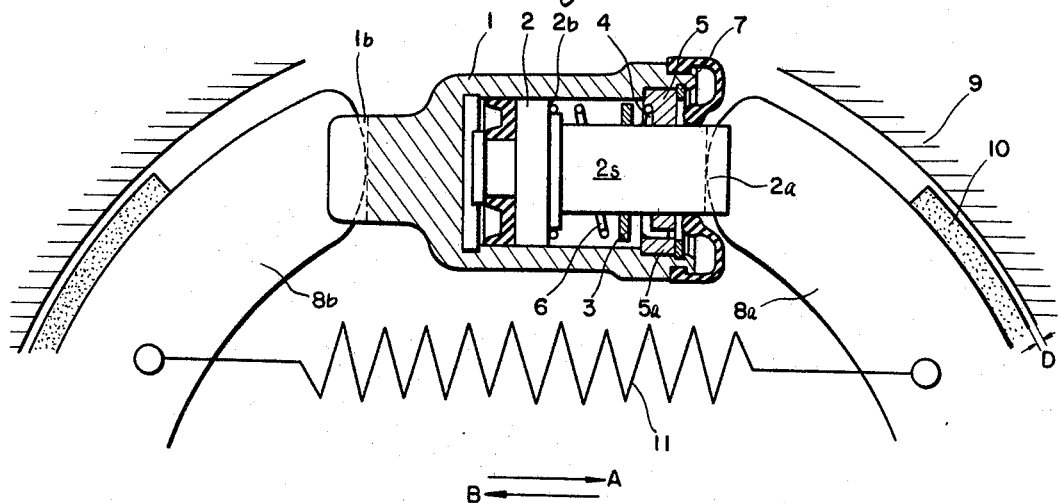
FIGURE 1 is a vertical section of a wheel cylinder equipped with an automatic device for compensation of the brake clearance according to the present invention.

Referring to the drawing, the inner wall of a wheel cylinder 1 has a shoulder 1a (FIG. 2), and at the closed end of the cylinder 1 there is a forked end 1b for receiving the upper end of a lefthand brake shoe 8b. In the cylinder 1, there is a piston 2 having a step 2b, and its stem 2s has at its outer end another fork 2a for receiving the upper end of another brake shoes 8a. 3 is an annular control disc having an ear 3a (FIG. 3), a small hole 3b for receiving one end of a spring 6 to be referred to hereinafter. The said control disc 3 is loosely mounted onto said piston stem 2s and the ear 3a thereof is slidably inserted into a slot 1c (FIG. 2) provided in the inner wall of the open end portion of the cylinder 1, so that the control disc 3 is prevented from rotation around the piston stem 2s.

Figure 5:
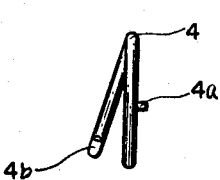

A spring 4 shown in FIG. 5 is disposed between the control disc 3 and a spring seat or stopper 5, with its end 4a inserted into a small hole 5a of the stopper 5 (FIG. 5) and with the other end 4b abutting against the control disc 3, so that the spring 4 is normally maintained under tension and the ear 3a of the control disc 3 is abutting against the shoulder 1a of the cylinder 1 by the action of the spring 4, whereby the control disc 3 is held in slightly inclined position in engagement with the piston stem 2s.

Another spring 6 shown in FIG. 6 is disposed between the control disc 3 and the piston 2, with its end 6a inserted into a small hole 3b of the control disc 3 and the other end portion 6b abutting against the step 2b of the piston 2, so that the spring 6 normally assists in holding the control disc 3 slightly inclined and in firm engagement with the piston stem 2s. The manner of firm engagement of the control disc 3 with the piston stem 2s is exaggeratedly shown in FIG. 7, in which it will be seen that in the inclined position of the disc 3, upon axial movement of the piston stem, the edges 3d and 3e of the disc 3 are held in biting contact with the piston stem.

The spring seat or stopper 5 is mounted and held in the cylinder 1 by means of a stop ring 7, leaving a clearance C (FIG. 2) between the ear 3a of the control disc 3 and the stopper 5, the parts being so designed and arranged that the control disc 3 may axially move forwardly to absorb said clearance C, and that the allowed amount of shift of said control disc 3 will become zero when the predetermined brake clearance D between a brake drum 9 and the brake lining 10 becomes zero. 11 is a return spring connecting both brake shoes 8a and 8b.

Figure 2:
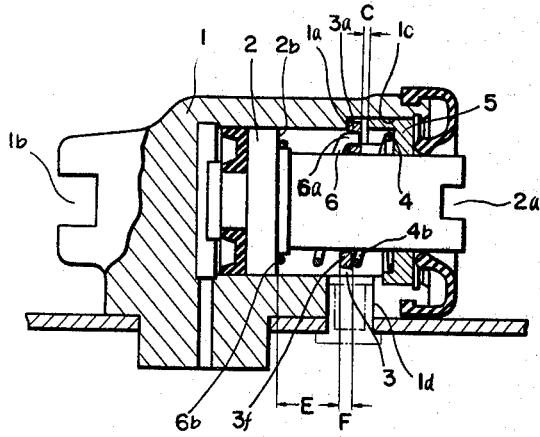
FIGURE 2 is a horizontal section thereof.
Figure 3:
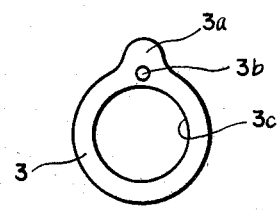
FIGURE 3 is a side view of an annular control disc employed in the device of this invention.
Figure 4:
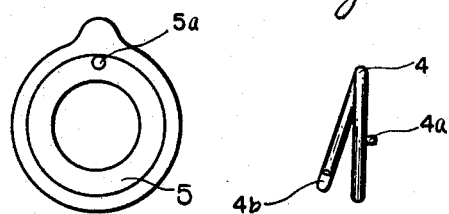
FIGURE 4 is a side view of a spring seat acting as a stopper.

Energized by pressure oil supplied from a master cylinder (not shown), the stepped piston 2 will move in the direction of arrow A, and the control disc 3 which is in firm engagement with the piston stem 2s in its inclined position as normally biassed by the springs 4 and 6, and this control disc will also be shifted in the same direction. At this time, the control disc 3 will not be rotated around the stem 2s, because of the fact that the ear 3a is guided by the slot 1c of the wheel cylinder 1. As described above, it is so determined that the clearance C between the control disc 3 and the stopper 5 becomes zero as acted by the piston 2 at the time when the clearance D between the brake drum 9 and the brake lining 10 becomes zero. Hence, at the time when the ear 3a of the control disc 3 just abuts against the side face of the stopper 5 according to the movement of the piston in the direction of arrow A, the brake clearance D will become zero, and the desired braking action will be effected, provided that there is not any increase of the brake clearance D. When the brake pedal is released for releasing brake, the control disc 3 which has been in firm engagement with the piston stem 2s in the inclined position will return together with the piston stem in the direction of arrow B by the action of the return spring 11 connecting the brake shoes 8a and 8b. The movement of the control disc 3 will be stopped when the ear 3a abuts against the shoulder 1a of the cylinder 1, with the inner edges 3d and 3e of the central bore 3c being in firm contact with the piston stem 2s as shown in FIGS. 2 and 7, whereby the brake releasing action will be terminated.

Upon repeating the above mentioned brake action, the predetermined brake clearance D will be gradually increased due to wear of the brake drum and/or the brake lining 10, and the stroke of the piston 2 will be gradually increased accordingly, and at last the ear 3a of the control disc 3 will abut against the inner face of the stopper 5, thereby the inclined control disc 3 will be erected and the piston stem 2s will be freed from the control disc 3 and assuming that there has been produced any increase of the brake clearance D, the piston stem 2s alone will be farther shifted forwardly relative to the control disc 3 which is now stopped. Upon return movement of the piston, the control disc 3 abuts against the shoulder 1a, holding its inclined position, while the piston 2 will be stopped in the position slightly advanced relative to said position of the control disc 3 for the amount corresponding to the increased amount of wear of the brake lining and the brake drum. In other words, it will be seen that the position of the piston 2 as seen at starting point will be changed by being gradually shifted forwardly upon repeated operation, while the position of the control disc 3 is maintained within the range of the clearance C. Thus, the brake clearance may be automatically adjusted to be held substantially constant, and the driver's pedalling stroke will also be kept constant.

For the purpose of calling driver's attention of the necessity of renewing the worn brake lining, the dimension E (FIG. 2) corresponding to the effective thickness of the lining is established. When it is deemed necessary to renew the brake lining 10, the step 2b of the piston 2 reaches near one face 3f of the control disc 3, when the brake is applied in this position, the automatic clearance adjustment will be inoperative, but the amount of shift of the piston stem 2s will be increased for the amount F corresponding to the amount of inclination of the control disc 3. This amount F corresponds with the increased amount of the brake clearance D and corresponding increase of the driver's pedalling stroke, so that driver's attention may be called for. 1d is a window provided in the cylinder shell 1, through which the dimension of E is visible, enabling to ascertain the condition of wear of the brake lining 10.

In the modified form of the embodiment of this invention as shown in FIGURES 8 and 9, between the stopper 5 and the stop ring 7 there is inserted a spring 12 which is stronger than the spring 4. When the brake lining wears away for the amount necssitating renewal thereof, the step 2b of the piston 2 will come near the face 3f (FIG. 2). If the brake is applied in this state, the automatic clearance adjustment would not be effected as above described. However, in view of the dimension F (corresponding to the amount of inclination of the control disc 3) and the dimension G (FIG. 8) which corresponds with the forward shift of the stopper 5 compressing said spring 12, the amount of movement of the piston 2 will be considerably increased, resulting in corresponding increase of the brake clearance D, so that the driver may be warned of the necessity of renewing the brake lining based on increase of his pedalling stroke.

From the foregoing, it will be seen according to the present invention that by the provision of the annular control disc 3 loosely mounted onto the piston stem 2s in the wheel cylinder 1 for actuating the brake shoes, said control disc being adapted to be slightly inclined by means of the springs so as to firmly engage with the piston stem and adapted, by abutting against the stopper 5 disposed at the point which corresponds with the point where the brake lining 10 would contact with the brake drum 9 to be freed from the piston stem, whereby allowing thereafter the piston stem 2s alone to adavnce for the increased amount of the brake clearance leaving the control disc 3 to the stopped position, so that always the brake clearance may be automatically adjusted.

What we claim is:
1. A device for automatically adjusting the brake clearance provided in conjunction with a wheel cylinder for vehicle brake, comprising a cylinder having at its closed end a fork connected with a brake shoe, a piston having a stem extended from the open end of the cylinder and having another fork connected with another brake shoe, a shoulder provided in the inner wall of the cylinder, a window provided in said cylinder for ascertaining the condition of wear of said brake, an annular control disc having an ear and loosely mounted onto said piston stem, an axially acting spring or springs for holding said control disc in inclined position to keep it in firm engagement with said piston stem, said ear of the control disc being abutting against said shoulder at starting position of the piston, and a stopper disposed in front of said shoulder, making a clearance between said shoulder and the stopper, which clearance corresponding to the predetermined amount of brake clearance, the arrangement being such that the said ear of the annular control disc abuts against said stopper said inclined control disc is erected, releasing the firm engagement thereof with said piston stem, thereby said piston stem alone is allowed to advance further for the excess distance to absorb the increased amount of the brake clearance.

2. A device for automatically adjusting the brake clearance provided in conjunction with a wheel cylinder for vehicle brake, comprising a cylinder having at its closed end a fork connected with a brake shoe, a piston having a stem extending from the open end of the cylinder and having another fork connected with another brake shoe, a shoulder provided in the inner wall of the cylinder, an annular control disc having an ear and loosely mounted onto said piston stem, a first axially acting spring seated at axially one side of the control disc, a second axially acting spring seated at the axially opposite side thereof, each of said first and second spring holding said control disc in inclined position to keep it in firm engagement with said piston stem, said ear of the control disc being abutting against said shoulder at starting position of the piston, and a stopper disposed in front of said shoulder, making a clearance between said shoulder and the stopper, which clearance corresponding to the predetermined amount of brake clearance, and a further spring seated behind said stopper, strong than said second spring seated between the stopper and the control disc, said stopper is slidably mounted on the piston stem against said further spring for predetermined distance, the arrangement being such that when the said ear of the annular control disc abuts against said stopper said inclined control disc is erected, releasing the firm engagement thereof with said piston stem, thereby said piston stem alone is allowed to advance further for the excess distance to absorb the increased amount of the brake clearance.

3. Device for automatically adjusting the brake clearance as recited in claim 2, wherein a window is provided in the cylinder shell.

References Cited

UNITED STATES PATENTS

| | | |
|---|---|---|
| 860,249 | 7/1907 | Sauvage. |
| 2,951,560 | 9/1960 | Smellie _____ 188—196 X |
| 3,091,310 | 5/1963 | Smith et al. _____ 188—196 |
| 3,338,352 | 8/1967 | Guilhamat _____ 188—196 |

DUANE A. REGER, Primary Examiner

U.S. Cl. X.R.

188—1, 196